United States Patent

[11] 3,580,361

| [72] | Inventors | Giorgio Eggstein<br>Ospedaletti San Remo, Italy;<br>Heinz Ungerer, Stuttgart-Zuffenhausen,<br>Germany |
|---|---|---|
| [21] | Appl. No. | 833,997 |
| [22] | Filed | June 17, 1969 |
| [45] | Patented | May 25, 1971 |
| [73] | Assignee | Ernst Heinkel Aktiengesellschaft<br>Stuttgart-Zuffenhausen, Germany |
| [32] | Priority | June 21, 1968 |
| [33] | | Germany |
| [31] | | A5974/68 |

[54] DISC BRAKE CONSTRUCTION
11 Claims, 4 Drawing Figs.

[52] U.S. Cl. .................................................. 188/72.4,
188/73.6
[51] Int. Cl. .................................................. F16d 55/224
[50] Field of Search ................................. 188/71.1,
72.4, 73.1, 73.3, 73.5, 73.6, 250 (B), 205.3

[56] References Cited
UNITED STATES PATENTS
| 3,260,332 | 7/1966 | Wells.......................... | 188/73.6 |
| 3,261,430 | 7/1966 | Wilson et al................. | 188/73.6 |
| 3,357,523 | 12/1967 | Reed et al.................... | 188/73.5 |
| 3,387,687 | 6/1968 | Eggstein et al............... | 188/73.3X |
| 3,402,789 | 9/1968 | Biabaud....................... | 188/73.6 |

*Primary Examiner*—George E. A. Halvosa
*Attorney*—Michael S. Striker

ABSTRACT: A disc brake comprises a rotor disc mounted for rotation about a predetermined axis. A mounting element straddles a section of the periphery of the disc and is adapted to be secured to a vehicle. A presser element also straddles the section and has portions located at the opposite sides of the disc. It is guided by the mounting element for movement axially of the disc. A friction pad is arranged between each of the portions of the presser element and the associated side of the rotor disc. Mounting means mounts each friction pad for free and independent sliding movement axially of the rotor disc between an inoperative position and an operative position in which latter it frictionally engages the rotor disc. Actuating means is associated with the presser element and one of the friction pads for urging the same in one axial direction to operative position while effecting concomitant movement of the presser element in opposite direction with resulting displacement of the other friction pad by the associated portion of the presser element to operative position.

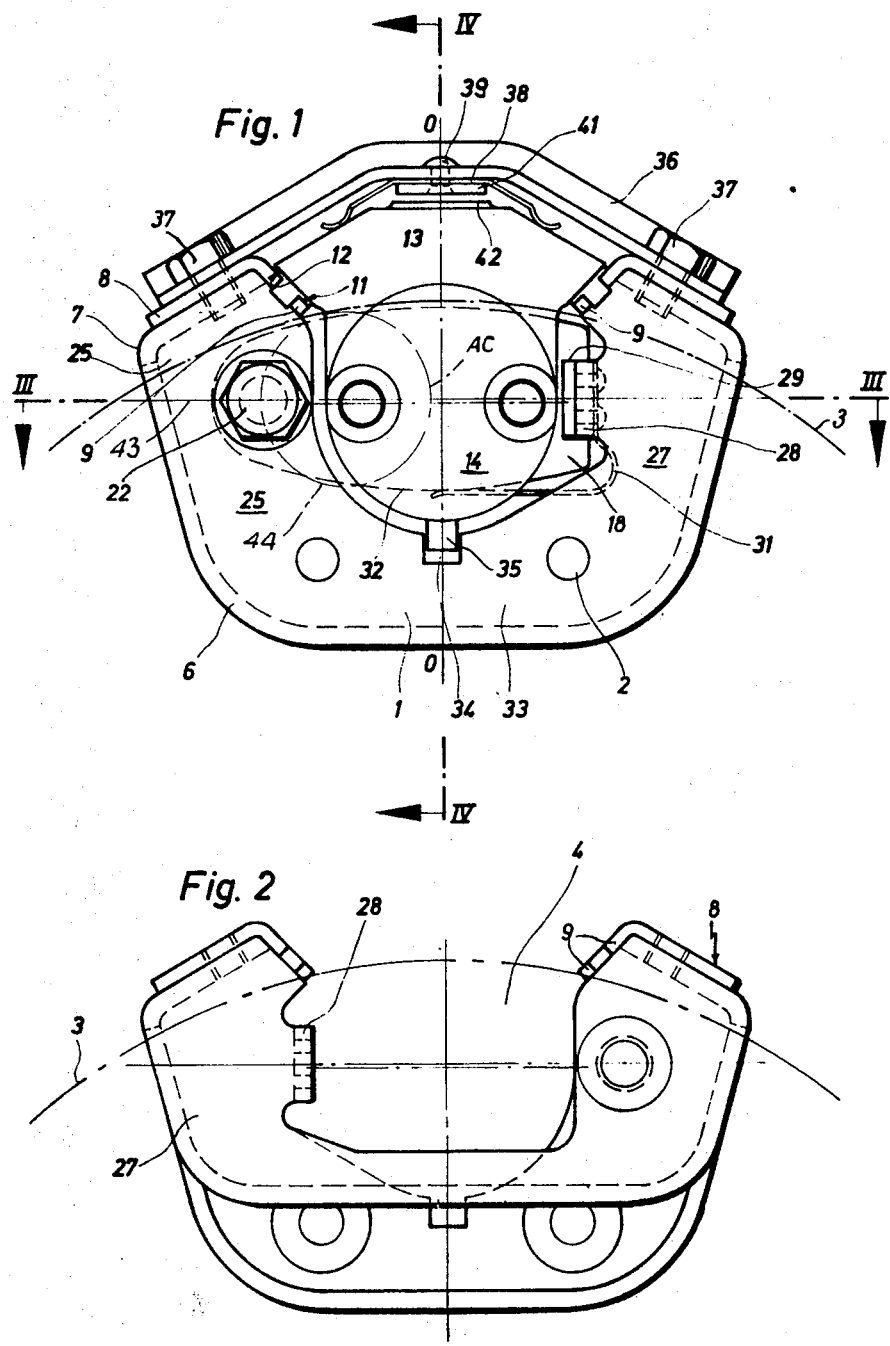

DISC BRAKE CONSTRUCTION

BACKGROUND OF THE INVENTION

The present invention relates generally to disc brakes, and more particularly to disc brakes which can advantageously but not exclusively be employed in automotive vehicles.

It is already known to construct so-called "floating saddle disc brakes" wherein a substantially U-shaped member straddles a section of the periphery of a rotor disc and is movable axially of the latter, with a single piston being provided which presses one friction pad against one side of the rotor disc whereas the other friction pad is carried by that portion of the U-shaped member which is located at the other side of the rotor disc and which, as a result of the reaction movement performed by the U-shaped member when the piston is operated to press the one friction pad against one side of the rotor disc, is pressed against the other side of the same. Disc brakes of this type are considerably more simple in their construction and considerably less subject to mechanical difficulties than the conventional type wherein the member straddling the periphery of the disc is stationary and two cylinders are provided at opposite axial sides of the disc each of which urges an associated friction pad against the disc.

However, while this type of disc brake is simpler and more reliable, as just pointed out, it is desirable to further simplify this construction in order to render it less expensive and also to further decrease the possibility of mechanical difficulties without, however, adversely affecting its operational capabilities.

SUMMARY OF THE INVENTION

It is, accordingly, an object of the present invention to provide a disc brake of the aforementioned type which is possessed of these desirable advantages.

A further object of the invention is to provide such a disc brake which can be readily serviced, and wherein the inspection and replacement of the friction pads in particular is greatly simplified, without requiring extensive disassembly of the brake and/or auxiliary components associated with the same.

Still a further object of the invention is to provide such a brake wherein the development of noises, particularly whistling noises, which at times occur in known disc brake constructions, is prevented.

In pursuance of the above objects, and others which will become apparent hereafter, one feature of our invention resides in the provision of a disc brake, particularly for automotive vehicles which briefly stated comprises a rotor disc mounted for rotation about a predetermined axis, and a mounting element straddling a section of the periphery of the rotor disc. A presser element also straddles the section of the rotor disc periphery. It has portions which are located at the opposite axial sides of the rotor disc. This presser element is "floatingly" mounted, in that it is guided by the mounting element for movement axially of the rotor disc in opposite directions. A friction pad is arranged between each of the aforementioned portions of the presser element and the associated side of the rotor disc. Mounting means mounts each of these friction pads for free and independent sliding movement axially of the rotor disc between an inoperative position and an operative position in which latter it frictionally engages the rotor disc. Actuating means is provided and operatively associated with the presser element and one of the friction pads for urging the one friction pad in one axial direction to operative position while concomitantly effecting movement of the presser element in the opposite axial direction with resulting displacement of the other of the friction pads to operative position by the associated portion of the presser element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic side elevational view of a brake according to our invention;

FIG. 2 is a view similar to FIG. 1 but seen from the opposite side of the brake;

DESCRIPTION OF THE PREFERRED EMBODIMENTS

Figure 3:
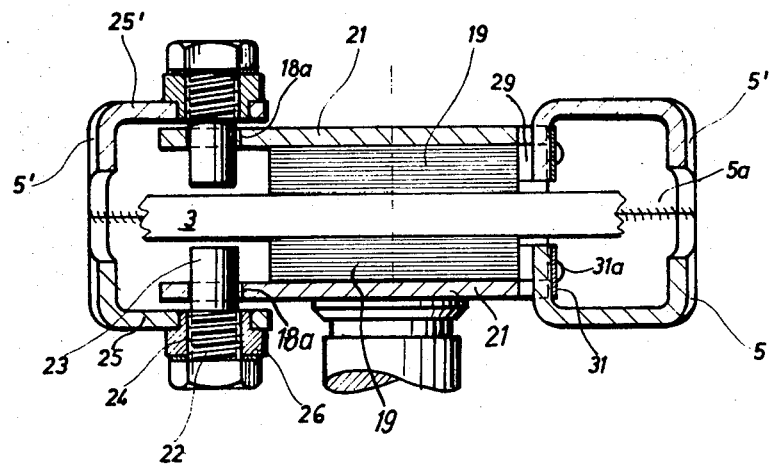
FIG. 3 is a section on the line III–III of FIG. 1.

As already pointed out, the illustration in the drawing of the exemplary embodiment is somewhat diagrammatic in nature. Certain supporting components, such as fluid connections to the brake and portions of the vehicle body to which the brake is mounted, have been omitted for the sake of clarity. It is to be understood, however, that the brake illustrated in the drawing is rigidly secured to a portion of the vehicle body via screws or bolts penetrating the bores 2 in the mounting element 1 whose cross-sectional configuration is more clearly identified in FIG. 3 and which straddles, as evident from FIG. 3 as well as from FIG. 2, a section of the periphery of a conventional rotor disc 3 which, being only diagrammatically suggested in FIG. 2, is mounted for rotation about a predetermined axis in conventional manner. Such rotor discs are well known in the art, and the manner in which the element 1 straddles a section of the periphery of the rotor disc 3 is also well known to those conversant with this field.

FIG. 3 shows that the element 1 is preferably and in accordance with the present invention composed of two shell-shaped portions 5, 5' which advantageously are pressed or stamped from sheet metal. Their juncture, located radially opposite the straddled section of the rotor disc periphery, is identified with reference numeral 5a and along this juncture they are secured to one another, as by welding. Their marginal zones 6 are bent at right angles in direction inwardly towards the rotor 3, as evident from FIG. 1, so as to provide stiffening and reinforcement for the element 1. Of course, this latter feature can be omitted, or a different type of reinforcement can be provided.

Each of the shell sections 5, 5' is provided with a substantially U-shaped cutout 4 which is open in radial direction of the rotor disc, or more particularly in radially outward direction thereof. This is clearly shown in FIGS. 1 and 2. The outer edge faces of the element 1, along which the abutment end welding line 5a extends, are identified with reference numeral 7 and it will be seen that L-shaped sheet metal members 8 are provided which overlie the outer edge faces 7 with one arm and are connected thereto in suitable manner, for instance by a spot welding. The other arm 9 of each of the members 8 is bent inwardly into the substantially U-shaped cutout so that the exposed surfaces 11 of the arms 9 are inclined towards one another and to the axis 0–0 of the rotor disc 3 at an angle which is illustrated as being 45°.

Figure 4:
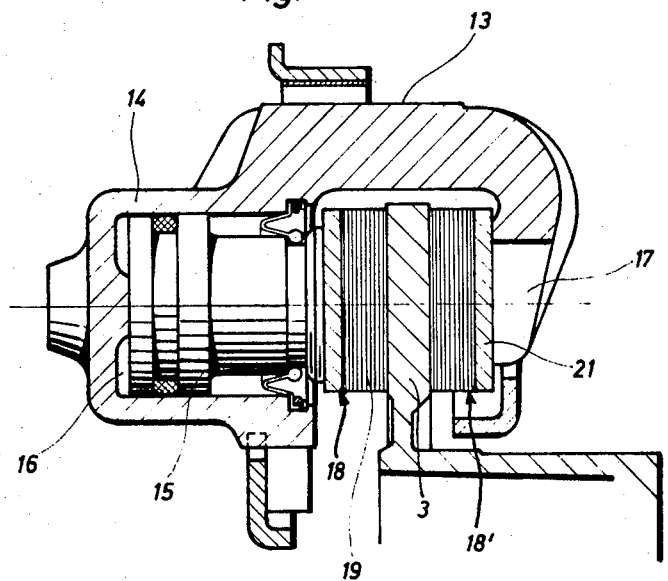
FIG. 4 is a section taken on the line IV–IV of FIG. 1.

A presser member 13 constitutes the "floating saddle" known from prior-art "floating-saddle" disc brakes and also straddles a section of the periphery of the rotor disc 3 within the confines of the cutouts 4. A single cylinder 14 is provided in one arm or portion of the presser member 13, and a piston 15 is slidable in the cylinder 14 on introduction of a pressure medium into the space 16. The one arm or portion of the presser member 13 which is provided with the cylinder 14 is located at one axial side of the rotor disc 3, as evident from FIG. 4; located at the opposite axial side of the rotor disc 3 is the other arm or portion 17 of the presser member 13.

Intermediate the respective axial sides of the rotor disc 3 and the piston 15 on the one hand, and the arm 17 on the other hand, there are located the friction pads 18, 18' which, contrary to the practice known from the prior art, are not connected to the cylinder 15 and the arm 17, respectively. These friction pads each consist of a layer of braking material 19 and a carrier layer 21. They are mounted on the mounting element for free and independent sliding movement axially towards and away from the respectively associated side of the rotor disc 3. For this purpose they are provided with bores 18a which slidably accommodate cylindrical portions 23 of bolts 22 which are threaded into tapped bores 24 of the portions 25, 25' of the mounting element 1 and which project in direction axially towards the rotor disc 3. For reinforcing purposes we prefer to provide reinforcing sleeves 26 which are received in suitable apertures in the portions 25, 25' and welded thereto, with the bores 24 being provided in these sleeves 26. In accordance with the invention the bolts 22 are located as close as possible to the axis of rotation of the rotor disc 3, so that they are juxtaposed with the respective axially directed radial faces of the same. Additionally they are so arranged that during the normal forward movement of the vehicle with which the brake is associated, the friction pads 18, 18' will be subjected only to tensile stress when the brake is actuated. For this purpose, and as shown in the drawing, the bolts 22 are arranged rearwardly of the centers of the friction pads 18, 18' as seen with respect to the direction of rotation of the rotor disc during forward movement of the vehicle, on a line 43 intersecting the respective center. However, they can also be located on a circle 44, on the same side and as seen from the center, which surrounds the axis of rotation of the rotor disc 3 and intersects the center of the friction pads. The centers of the friction pads are approximately the same as the center of cylinder 14 and for convenience have been so indicated with reference character AC, which stands for "approximate center."

Each of the sections 5, 5' is provided at that edge of the cutout 4 which is associated with the arm 27 of the member 1, with a tongue or projection 28 which project from opposite sides in direction towards the member 3. Each of the friction pads 18, 18' on the other hand is provided in a marginal portion remote from the respective bores 18a with a recess 29 accommodating the respective projection 28. These projections, incidentally, can be provided in various ways, for instance by affixing a separate member to the sections 5, 5' or by bending portions of these sections in suitable manner. The apertures 18a and the recesses 29 extend through both layers 19 and 21 of each of the friction pads 18, 18' and are of identical dimensions in each of these layers so that the frictional forces which are to be transmitted to the mounting element 1 are transmitted not only via the respective layers 21 but also in part directly from the layer 19 to the element 1.

As shown in FIG. 1 in particular, the projections 28 each have secured thereto via rivets 31 or the like, a leaf spring 31 so configurated as to press against an edge face 32 of the respective friction pad 18, 18' so that an inner edge portion bounding the respective slot or recess 29 is urged against the corresponding projection 28 under pressure. It is essential in configurating and affixing the respective leaf spring 31 that its major plane be normal to the radial contact faces of the rotor disc 3 and parallel to the abutment surfaces 32 with which the respective friction pads 18, 18' contact the leaf springs 31. The purpose of this is to assure that the pressure exerted by the leaf springs 31 on the associated friction pads will act exactly in parallelism with the radial contact surfaces of the rotor disc 3.

FIG. 1 shows that the cylinder 14 is provided with a projection 35 and that the larger section 5 of the element 1, that is the section provided with bores 2, is formed in the bight 33 of the U-shaped cutout 4 with a groove 34 which guides the projection 35 to thereby guide the presser member 13 for movement axially of the rotor disc 3 and to prevent shifting of the position of the presser member 13.

A holding member 36 is provided which is threadedly connected with the element 1 by means of two screws 37 or analogous means and which serves to maintain the presser member 13 against movement out of the cutouts 4. A spring 38 presses the presser member 13, or rather the inclined surface portions 12 thereof, firmly against the inclined surfaces 11 of the arms 9 of the members 8, as shown in FIG. 1. Rivets or analogous elements 39 and a safety washer 31 connect this spring 38 with the holding member 36, the purpose of the safety washer 41 being to assure that the presser member 13 will be maintained in position even if the spring 38 should break. For this purpose the presser member 13 is provided with a raised even surface portion 42.

It will be understood that if a pressure fluid is introduced into the space 16 of the cylinder 14, the piston 15 is pressed against its associated friction pad 18 and displaces the same into contact with the respective radial contact face of the rotor disc 3. As a reaction to this, the presser member 13 and accordingly the arm or portion 17 thereof is moved in opposite axial direction, pressing the friction pad 18 against the opposite radial contact face of the rotor disc 3. Thus, the piston 15 and the arm 17 press against their respectively associated friction pads 18 and 18' as before, that is as already known from the art, but unlike the prior art they are not connected with these friction pads 18, 18' which can be freely and independently moved in axial direction of the rotor disc 3 by sliding on the cylindrical portions 23 of the bolts 22. Because of this mounting of the friction pads 18, 18' for free independent movement axially of the rotor disc 3, and without connection to the cylinder and arm 17, respectively, the friction pads 18, 18' can be removed for inspection or replacement simply by removing the screws 37 and withdrawing the holding member 36, whereupon the presser member 13 can be lifted off the rotor disc 3 and the element 1 in radial direction. Flexible conduits for pressure fluid which are connected with the cylinder 14 need not be disconnected for this purpose. This, evidently, facilitates greatly servicing and repair of the novel brake. The bolts 22 are threaded out of their associated tapped bores 24 until their portions 23 clear the apertures in the friction pads 18, 18' which thereupon are shifted in such a manner that the projections 28 are withdrawn from the associated recesses 29 to the extent necessary to permit lifting of the friction pads out of the cutouts 4. To reinstall the friction pads, or to install new ones, this procedure is reversed.

Our novel disc brake will thus be seen to provide all of the advantages set forth earlier as being desirable, in that it is of simpler construction than was heretofore known and can be readily assembled and disassembled for inspection and repair purposes. Additionally, it is not necessary during disassembly to separate the auxiliary connections, such as the fluid conduits associated with the cylinder 14, and it has been found that the undesirable noises which sometimes develop in prior art disc brake constructions are also avoided with the brake according to our invention.

It will be understood that each of the elements described above, or two or more together, may also find a useful application in other types of applications differing from the types described above.

While the invention has been illustrated and described as embodied in a disc brake, it is not intended to be limited to the details shown, since various modifications and structural changes may be made without departing in any way from the spirit of the present invention.

We claim:

1. A disc brake, particularly for automotive vehicles, comprising a rotor disc mounted for rotation about a predetermined axis; a mounting element straddling a section of the periphery of said rotor disc and being provided at opposite axial sides of the latter with substantially U-shaped cutouts inwardly of said periphery; a presser element also straddling said section and having portions located at said opposite axial sides; pairs of mutually inclined guide faces bounding opposite sides of the respective cutouts in the region of said periphery, and cooperating guide faces on said presser element engaging said guide faces and suspending said presser element in said cutouts for movement axially of said rotor disc; a pair of friction pads each arranged between one of said portions of said presser element and the associated axial side of said rotor disc, and mounting bolts connecting said friction pads only with said mounting element for sliding movement axially of said rotor disc independently of one another and of said presser element, between an inoperative position and an operative position in which latter they engage said rotor disc; a cylinder and piston unit provided on one of said portions of said presser element intermediate said one portion and the respectively associated friction pad for engaging and urging the latter in one axial direction of said rotor disc to said operative position and for thereby effecting concomitant reactive sliding movement of said presser element on said guide faces in the opposite axial direction with resulting displacement of the other of said friction pads to said operative position by the other of said portions of said presser element; and cooperating slot and projection means between said mounting element and said presser element located in the region of said mutually inclined guide faces.

2. A disc brake as defined in claim 1, said bolts being arranged on said mounting element within the area outlined by the circumference of said rotor disc so as to be juxtaposed with one of said sides of the latter.

3. A disc brake as defined in claim 1, said friction pads each having an aperture and said bolts projecting from opposite sides of said rotor disc toward the same normal to said general plane, each bolt being received in one of said apertures.

4. A disc brake as defined in claim 3, said rotor disc normally rotating in one direction dictated by forward movement of said vehicle; and said bolts being located rearwardly of the centers of said friction pads, as seen with reference to said one direction, and on a circle which surrounds the axis of said rotor disc and intersects the centers of said friction pads.

5. A disc brake as defined in claim 1, said mounting element comprising two shell sections each located at one side of said rotor disc and abutting one another opposite the periphery of the latter, said shell sections having substantially U-shaped cutouts aligned axially of said rotor disc and each extending in direction inwardly from said periphery, and a pair of substantially L-shaped members at opposite sides of the respective cutouts and each having one arm overlying the juncture of said shell section and connected to the latter, and another arm extending into said cutouts, said other arms being inclined towards one another and constituting the guide faces for movement of said presser element axially of said rotor disc.

6. A disc brake as defined in claim 5, said shell sections having major portions extending in parallelism with the general plane of said rotor disc, and marginal portions extending substantially normal to said major portions.

7. A disc brake as defined in claim 5, one of said U-shaped cutouts being provided with a guide groove in the bight of the U extending normal to the general plane of said rotor disc; and said presser element comprising a projection received in said guide groove for guiding said presser element for movement axially of said rotor disc.

8. A disc brake as defined in claim 5, said friction pads each having a recess extending inwardly from one edge thereof; and said mounting element being provided, at a side of said U-shaped cutouts which is circumferentially spaced from said bolts, with a pair of guide projections each extending in direction axially towards said rotor disc and each being received in one of said recesses for guiding the respective friction pads during movement thereof axially of said rotor disc.

9. A disc brake as defined in claim 8, said friction pads each comprising a carrier layer and a friction layer, and wherein said recesses extend through and are of identical dimensions in both of said layers.

10. A disc brake as defined in claim 8; and further comprising biasing means operative for exerting pressure against the respective friction pads in the general plane thereof and in a sense effecting abutment of an inner wall portion bounding the respective recesses against the associated guide projection.

11. A disc brake as define in claim 10, each of said friction pads having an edge face normal to its general plane and the general plane of said rotor disc and substantially parallel to the respective recess; and said biasing means comprising a pair of leaf springs each connected to one of said guide projections and each abutting against said edge faces of the associated friction pad.